United States Patent
Isom

[15] 3,649,976
[45] Mar. 21, 1972

[54] COMBINATION TOOL FOR USE WITH VEHICLE WHEELS

[72] Inventor: William Isom, General Delivery, Henefer, Utah 84033

[22] Filed: Aug. 31, 1970

[21] Appl. No.: 68,077

[52] U.S. Cl. ...............................7/1 E, 81/177 B, 254/131, 29/273
[51] Int. Cl. .......................................................B25f 1/00
[58] Field of Search...................7/1 E, 17; 81/177 B; 29/245, 29/267, 273; 254/131

[56] References Cited

UNITED STATES PATENTS

| | | |
|---|---|---|
| 2,212,716 | 8/1940 | Noble et al.................................7/1 E |
| 2,504,345 | 4/1950 | Nellis..........................................7/1 E |
| 2,639,121 | 5/1953 | Hudspeth..............................254/131 |

FOREIGN PATENTS OR APPLICATIONS 170,359   2/1952   Austria......................................7/1 E Primary Examiner—Travis S. McGehee
Assistant Examiner—Roscoe V. Parker, Jr.
Attorney—B. Deon Criddle

[57] ABSTRACT

A one piece, rigid combination tool which can be used to secure a spare wheel of a vehicle in a storage position and which can be used, even by women, to quickly and easily change a vehicle wheel.

2 Claims, 4 Drawing Figures

PATENTED MAR 21 1972 3,649,976

INVENTOR:
WILLIAM ISOM
BY:
B. Dean Liddell
ATTORNEY

COMBINATION TOOL FOR USE WITH VEHICLE WHEELS

BRIEF DESCRIPTION OF THE INVENTION

1. Field of the Invention

This invention relates to tools for use in the changing of wheels on automobiles and trucks.

2. Prior Art

There has long been a need for a tool that can be carried conveniently in a vehicle and that can be readily used to perform all of the functions necessary to the changing of the pneumatic-tired wheels of automobiles and trucks. A great many devices have been proposed for use in performing such operations. None, however, have been entirely suitable from both a cost and use standpoint.

SUMMARY OF THE INVENTION

It is a principal object of the present invention to provide a rigid, low-cost tool which can be conveniently stored on a spare wheel and which can be used to easily perform functions involved in the changing of a wheel, including the loosening and tightening of lug bolts or nuts; the lifting of the wheel and the aligning of it with the vehicle hub; the operation of a bumper jack; and hub cap removal. All components required for these varied operations are integral with the tool or result from its rigid construction and advantageous configuration.

Principal features of the present invention include two straight arm means which are fixed to opposite ends of a web member and that extend normal to the axis of the web member. The arms are spaced sufficiently apart such that a segment of a wheel can pass through the space between them but are close enough together so as not to allow full passage of the wheel therethrough. One of the arm means is bevelled to provide a sharp edge suitable for use in hub cap removal. The other arm preferably has a blunt end that can be inserted into the operating mechanism of a bumper jack and that can be used to locate lug holes in drums that use bolts rather than nuts to secure vehicle wheels in place. Extending in a direction opposite to that of the arms and fixed to the center of the web member is a socket arm, the free end of which has a lug socket adapted for a wheel lug bolt or nut fixed thereto. Directly opposite the socket arm and projecting from the web member is a metal tab with a hole therethrough which is used to attach the tool via a bolt to a spare wheel when the tool is not being used to change a wheel. The entire unit is preferably constructed of cast steel welded at the arm and tab connections to create a rigid, one piece member.

Additional objects and features of the invention will become apparent to those skilled in the art from the following detailed description and drawings disclosing what is presently contemplated as being the best mode of the invention.

THE DRAWINGS

In the drawings:

FIG. 1 is a perspective view of the invention;

FIG. 2, a top plan view showing the tool attached to a spare wheel and used as a holding means;

FIG. 3, a side elevation view, with the tool being used to lift a wheel; and

FIG. 4, a perspective view of the tool as used to operate a bumper jack.

DETAILED DESCRIPTION

Figure 1:
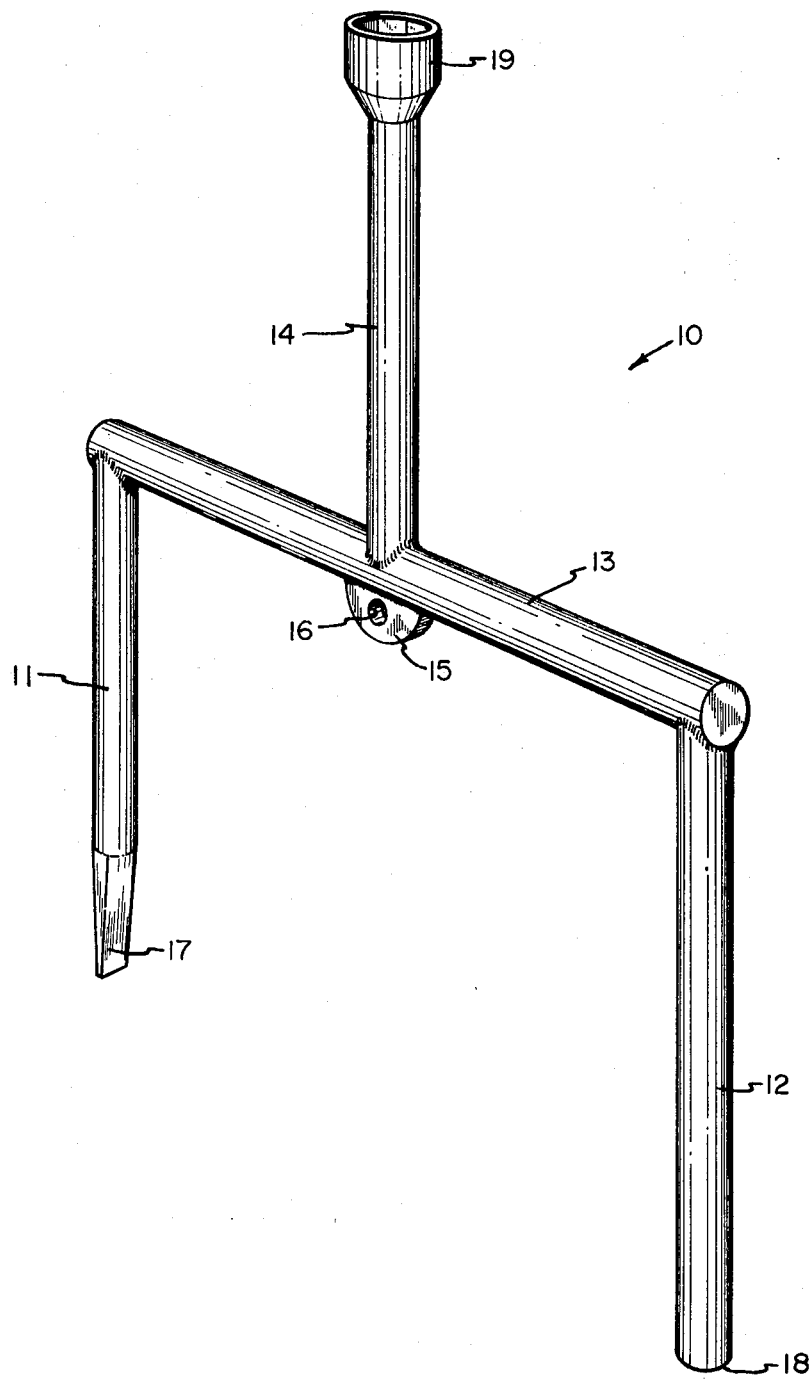

Referring now to the drawings:

In the illustrated preferred embodiment the combination tool 10 has two parallel arm members 11 and 12 fixed at 90° angles to opposite ends of a web member 13. Projecting in a direction opposite to said arms and connected at the center of web member 13 is socket arm member 14. A tab 15 with a hole 16 therethrough projects from the web member 13 at a point opposite to the connection between arm member 14 and the web member. Arm member 11 has a bevelled edge 17 at its free end and arm member 12 has a blunt end 18 at its free end. Arm member 14 has a lug socket 19 at its free end. The arms and the tab are each securely fixed, as by welding, to the web so that a solid, one piece tool is formed.

Figure 2:
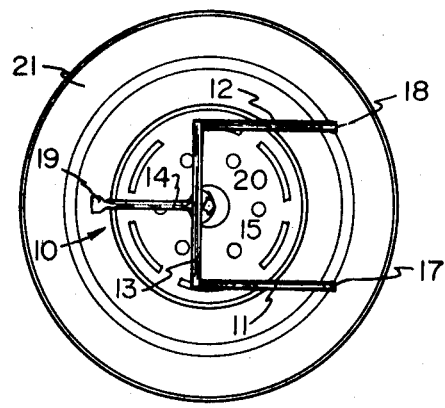
Figure 4:
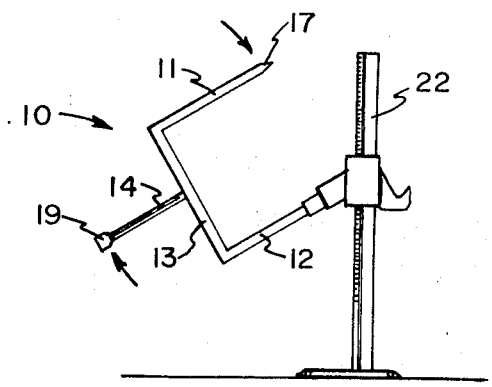

In use, and as best seen in FIG. 2, the tool 10 can be mounted by a bolt 20 and fixed receiving nut, not shown, to a spare wheel 21. The bolt is inserted through hole 16 and through a centering hole in the spare wheel 21 before being threaded into the receiving nut, which is fixed to the vehicle. As so arranged the arms project over the tire on the wheel and serve as a clamp to secure the wheel in place at the same time as the tool is conveniently stored. When the tool is needed for a wheel changing operation, bolt 20 is removed and the tool 10 is dismounted from the spare wheel. The blunt end 18 of arm 12 is then used with a bumper jack 22 to lift a vehicle. During this operation a user can put one hand on the free end of handle 11 and one hand on the free end of socket arm 14 and can simultaneously push down on one and up (as shown by the arrows, FIG. 4) on the other to operate the jack. Nearly twice the usual leverage can thus be obtained and even a woman can readily operate the jack. After the vehicle has been raised to the desired height and the jack has been secured, arm member 12 is removed from the jack and arm member 11 with a sharp, bevelled edge 17 thereon is used to pry away the hub cap on the wheel to be changed. The lug bolts or nuts attaching the wheel to the drum are next loosened using the socket 19 on the end of arm member 14. In turning the socket, which is fitted onto the nut or bolt head to be removed, a user applies force through the arms 11 and 12 to the ends of web 13. The force can be applied from a position directly in front of the wheel and depending on the direction of rotation one arm will be pushed down while the other is being raised. Thus, twice the torque normally applied through the presently most commonly used single handle lug wrenches is achieved and even a woman can easily remove and replace lug nuts or bolts with the invention.

Figure 3:
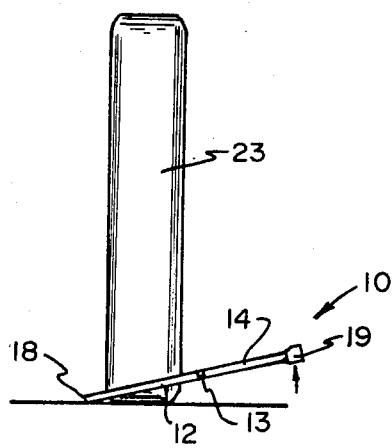

In removing the wheel 23, FIG. 3, from the vehicle drum, not shown, the arm members 11 and 12 are arranged to straddle and engage the lowermost portion of the tire such that their ends 17 and 18 rest on the ground behind the wheel. A lifting force is applied to arm member 14 to lift the wheel from the hub and the wheel falls free. If, as frequently is the case, the tire is hot, from having been run for some distance in a deflated condition, it is especially desirable that the user does not have to grasp the tire with his hands as the wheel is removed from the drum. Also, some persons, especially women, do not have the strength to lift the wheel directly. With the tool of the invention the leverage afforded makes it easy for anyone to lift the wheel to the extent necessary.

In placing a wheel on the vehicle a reverse procedure is followed. The wheel is leaned against the drum and the tool 10 is then used to elevate it into place on the drum. The lug nuts or bolts are tightened into place with the tool, the hub-cap is replaced and the jack is operated with the tool to lower the vehicle. Thereafter the tool can again be stored and can be used to clamp a spare wheel in place.

Although a preferred embodiment of my invention has been herein disclosed, it is to be understood that the present disclosure is made by way of example and that variations are possible, without departing from the scope of the hereinafter claimed subject matter, which subject matter I regard as my invention.

I claim:

1. A tire combination tool comprising:
    a straight web member having a length less than the diameter of a vehicle wheel;
    paralleled straight arm members fixed to the opposite ends of said web member and each extending therefrom at a 90° angle to said web;
    a straight socket arm member fixed to and projecting from the center of said web member and extending in a direction opposite to that in which the parallel arm members extend;
    a bevelled edge on the free end of one of said arm members;

a socket adapted to fit on a lug nut fixed on the free end of said socket arm; and means mounted on said web member, whereby the tool can be releasably secured to hold a spare wheel in place.

2. A tire combination tool as in claim 1, wherein the means mounted on said web member, whereby the tool can be releasable secured to hold a spare wheel in place comprises a tab with a hole therethrough projecting from the center of the web member at a location opposite to the socket arm member and centrally between the arm members fixed to the opposite ends of the web member.

* * * * *